United States Patent [19]
Gerner et al.

[11] 3,848,182
[45] Nov. 12, 1974

[54] APPARATUS FOR LIMITING PHASE-ANGLE RESPONSE RANGE, PARTICULARLY IN EDDY CURRENT TESTING APPARATUS

[75] Inventors: James Gerner, Elmhurst; Peter J. Suhr, Garden City, both of N.Y.

[73] Assignee: Magnetic Analysis Corporation, Mt. Vernon, N.Y.

[22] Filed: Aug. 15, 1973

[21] Appl. No.: 388,568

[52] U.S. Cl. ............................................... 324/40
[51] Int. Cl. ............................................ G01r 33/12
[58] Field of Search ............................. 324/37, 40

[56] References Cited
UNITED STATES PATENTS
3,405,354  10/1968  Callan et al. ......................... 324/40

*Primary Examiner*—Robert J. Corcoran
*Attorney, Agent, or Firm*—Pennie & Edmonds

[57] ABSTRACT

In eddy current testing apparatus utilizing quadrature signal detection, the quadrature signal components are multiplied by respective sine and cosine functions of an adjustable sine-cosine multiplying means to yield respective signals of substantially equal amplitude at a phase angle of the quadrature signal components depending on the setting of the multiplying means. Combining means yields minimum or substantially zero output when the signals are equal in amplitude, and a progressively increasing output as they become unequal. The resultant output is applied to an adjustable threshold circuit to produce a gate signal when the output lies within the angular sector desired. The gate signal may be used to control the passage of the quadrature signal components to an oscilloscope display, and the passage of vector signal amplitude to a threshold control circuit for classification such as marking, recording, etc. Thus the phase angle response may be limited to a desired range which is readily adjustable both in angular position and width. The arrangement may be useful in environments other than eddy current testing.

6 Claims, 4 Drawing Figures

APPARATUS FOR LIMITING PHASE-ANGLE RESPONSE RANGE, PARTICULARLY IN EDDY CURRENT TESTING APPARATUS

BACKGROUND OF THE INVENTION

This invention relates to limiting phase-angle response range, particularly in eddy current testing apparatus.

In some eddy current test equipments quadrature phase-sensitive detectors are used in conjunction with phase shifting means which permits vector rotation so that undesired signals such as noise appear largely along one axis of a display, say the horizontal axis of a cathode-ray oscilloscope, while signals of interest have substantial components along the other axis, say the vertical axis. The vertical quadrature component can then be used for indicating variations such as defects or flaws as by a chart recorder, a threshold control circuit actuating an alarm or marker, or other classifying menas. The amplitudes of the quadrature components vary with the phase of the initial signals corresponding to defects, flaws or other variations in the object under test, so that quadrature components in one direction may not have amplitudes proportional to flaw size. Also, while phase shifting may help to eliminate some undesired signals, other signals representing non-objectionable variations in the object may have phase angles such that they are not eliminated. Further, phase shifting circuits may increase the equipment noise and reduce sensitivity.

U. S. Pat. No. 3,405,354, issued Oct. 8, 1968 to Callan and Gerner, describes a number of circuits for limiting the response to a phase angle range of interest, thereby facilitating detection of objectionable variations in the object under test. Different circuits may be used to provide differently shaped characteristics, and circuits are described which provide outputs substantially proportional to vector amplitude within the selected phase angle range, rather than being proportional to a quadrature component thereof. In general, phase shifting circuits are employed along with the phase-angle limiting circuits so that any desired angular portion of the input signals can be brought within the pass band of the phase-angle limiter.

The present invention is directed to a phase-angle limiting circuit wherein both phase-angle limiting and the angular location thereof are combined in a relatively simple circuit, and both the angular width of the acceptance band and its phase with respect to the incoming signals may readily be adjusted.

SUMMARY OF THE INVENTION

In accordance with the invention, quadrature components of the detected signals in an eddy current testing apparatus are applied to adjustable sine-cosine multiplying means which multiplies the quadrature components by respective sine and cosine functions to yield respective signals of substantially equal amplitude at a phase angle of the quadrature signal components depending on the setting of the multiplying means. Combining means responsive to the respective signals yields an output of minimum value when the signals are of substantially equal amplitude and of progressively increasing value as the signals become unequal. The output of the combining means is applied to a threshold circuit which produces a gate signal when the output lies within a range corresponding to a limited phase angle range of the quadrature signal components. The gate signal controls one or more gate circuits supplied with an input signal(s) corresponding to at least one of the quadrature signal components, and yields output signals limited to signals lying within a restricted range of phase angles which are supplied to indicating or classifying means.

In a specific embodimetn, a pair of ganged sine-cosine potentiometers are supplied with the quadrature signal components and multiply respective components by the sine and cosine of the angle to which the potentiometers are set. The outputs of the potentiometers are supplied to a subtracting circuit (or algebraically adding circuit) which gives a zero output when the potentiometer outputs are equal in amplitude and a progressively increasing output as the potentiometer outputs become unequal. The sign of the output of the subtracting circuit changes from positive to negative on opposite sides of the zero point, and advantageously a full-wave rectifier is employed to give outputs of the same polarity on opposite sides of the zero point. The threshold circuit may be manually adjusted to a desired value above zero in accordance with the desired width of the phase-angle sector. With full-wave rectification, the point of zero output corresponds to a phase angle of the quadrature components in the center of the phase-angle sector, and adjusting the threshold circuit widens or narrows the sector approximately symmetrically about the center of the sector.

As will be understood from the foregoing, adjusting the sine-cosine multiplying means changes the angular location of the sector with respect to the phase of the quadrature signals, so that phase shifting of the quadrature components is unnecessary.

The gate signal may be used to control more than one gate as desired. In the specific embodiment, a dual gate passes the quadrature components to an oscilloscope to display only signals within the angle range selected. Provision may be made to disable the dual gate so as to display all signals. A second gate supplies a signal to classifying means such as a recorder, marker, alarm, etc. Although the second gate could supply only one quadrature signal to subsequent apparatus, it is preferred to combine both quadrature components to yield the vector amplitude, and pass the vector amplitude to subsequent apparatus.

DESCRIPTION OF THE SPECIFIC EMBODIMENT

Figure 1:
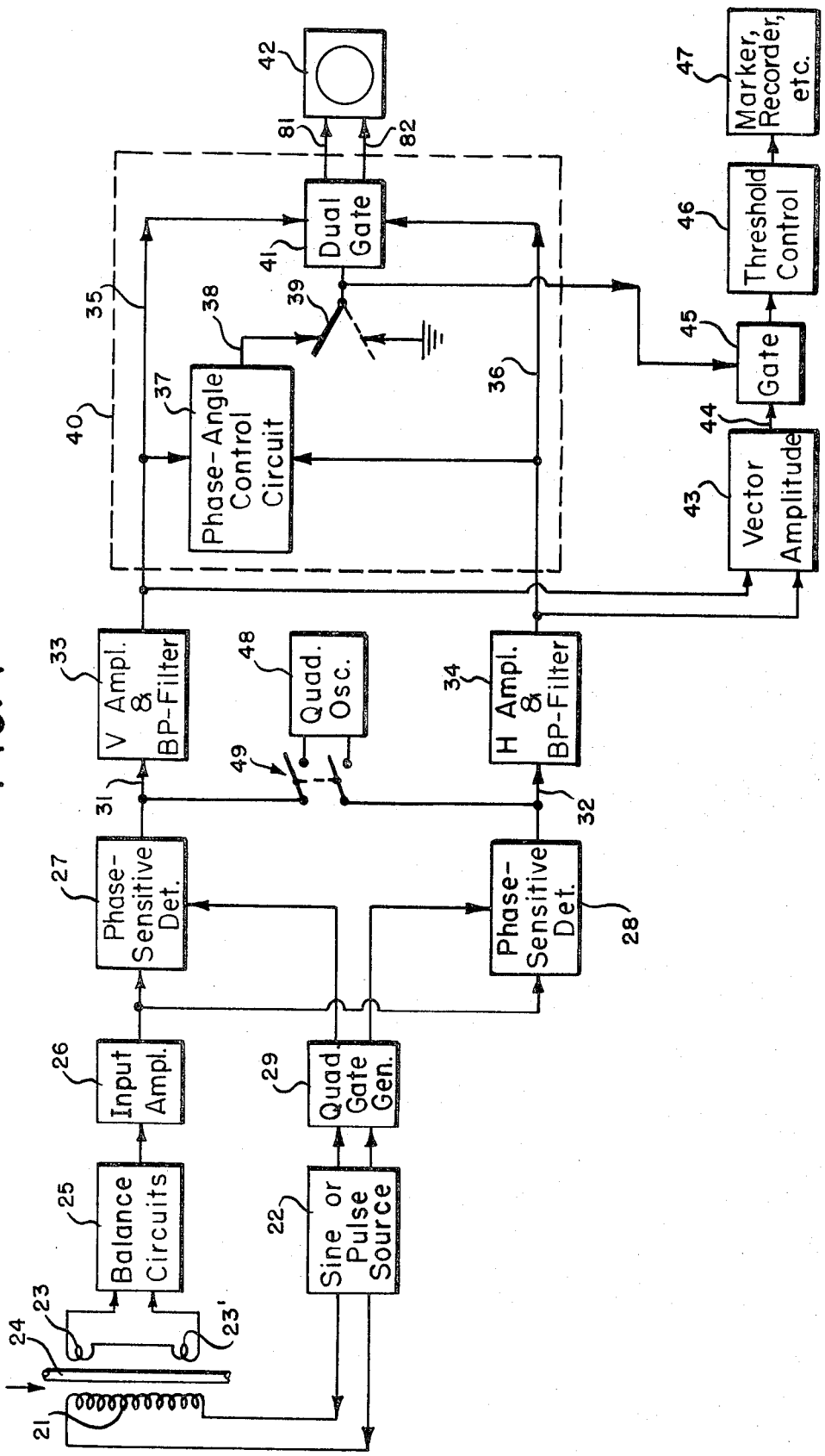
FIG. 1 is a block diagram of an eddy current testing apparatus in which the invention is employed.

Referring to FIG. 1, an eddy current testing apparatus of known type is shown, in which the phase-range limiting circuits of the invention are employed. The primary coil 21 is supplied with sine waves or pulses of desired frequency or PRF from source 22. A pair of detector coils 23, 23' are connected in series opposition to serve as a null type detector arrangement. The object under test is illustrated as a rod 24 passing continuously through a coil assembly as indicated by the arrow. In practice, the detector coils 23, 23' may be positioned inside the primary coil 21, coaxial therewith, and spaced apart in the axial direction. The rod 24 would then be arranged to pass along the axis of the coil assembly.

The detector coils are connected to balancing circuits 25 to yield a substantially zero output voltage when rod 24 is completely uniform, and also to provide any impedance matching required. If a portion of rod 24 has defects or flaws therein, or in general has variations therein, an output signal will be produced which will vary in amplitude or phase, or both.

Other types of test coil arrangements are known, such as a pair of coils axially separated and connected as two arms of a bridge circuit energized from an alternating or pulse current source.

The coil output signal is amplified in input amplifier 26 and supplied to two phase-sensitive detectors 27 and 28 in respective vertical and horizontal channels. The output of source 22 is supplied to a quadrature gate generator 29, the 90° outputs of which are supplied to detectors 27, 28. Accordingly, the outputs of the detectors in lines 31 and 32 are quadrature components of the signals from the detector coils. The respective quadrature components are amplified and bandpass filtered in blocks 33, 34. The amplified and filtered quadrature signal components hence appear in lines 35 and 36.

These quadrature components are fed to a phase angle control circuit 37 which produces a gate signal in line 38 when the phase angle of the components lies within a desired limited phase angle range of response. Switch 39 in the position shown supplies the gate signal to a dual gate 41. When the gate signal opens the gates, the vertical and horizontal quadrature components in lines 35, 26 are supplied to a cathode ray oscilloscope 42 for display. When switch 39 is in its dotted position, dual gate 41 is continuously open so that all output signals are displayed.

The V and H components in lines 35, 36 are also supplied to a vector amplitude circuit 43 which produces an output signal in line 44 representing approximately the magnitude of the vector represented by the H and V components thereof. This may be an adding circuit such as described in the aforesaid U.S. Pat. No. 3,405,354 which can be designed to yield an amplitude within approximately ± 4 percent of the true vector amplitude over a 360° angle range. More elaborate circuits could be designed to yield a more precise vector amplitude by taking the square root of the sum of the squares of the two quadrature components, in accordance with considerations known in the art. The vector amplitudes are supplied to gate 45 which is controlled from circuit 37. The output of the gate is supplied to a threshold control circuit 46 which passes signals above a desired level to classifying circuits 47 which may include a marker, a recorder, etc.

In order to test and adjust the phase angle control circuit and gate circuits, a quadrature oscillator 48 is provided which, when switch 49 is closed, supplies quadrature signals to the horizontal and vertical amplifiers and filters 33, 34.

Figure 2:
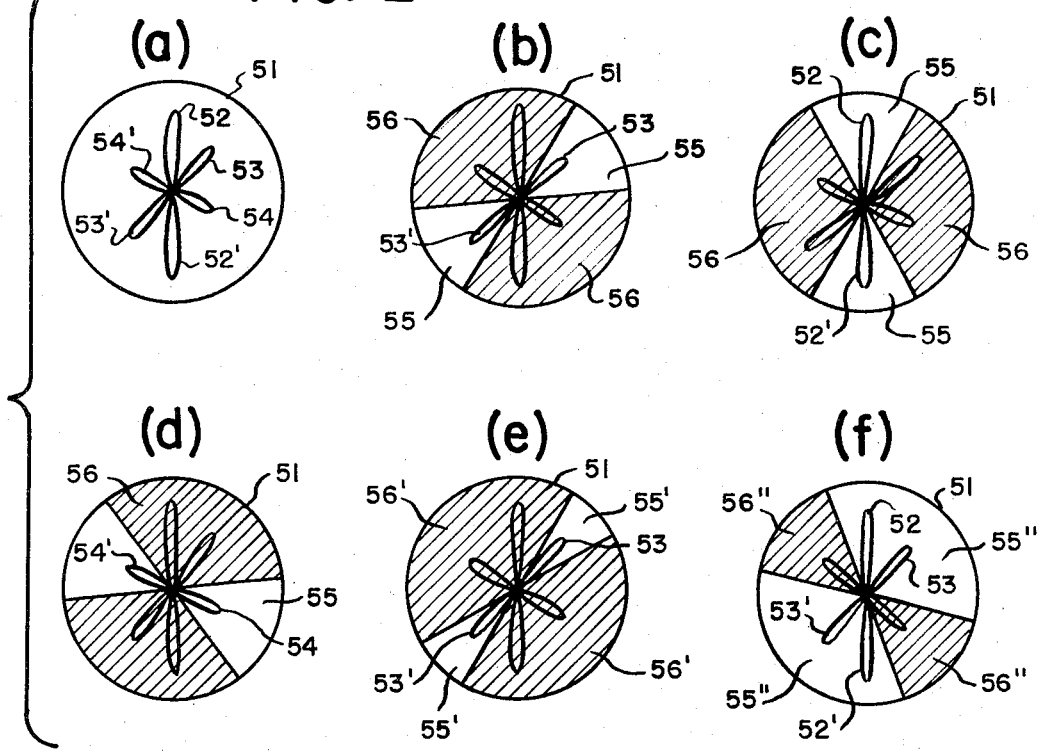
FIG. 2 shows illustrative polar displays which may be obtained.

Referring to FIG. 2, various possible displays in accordance with the invention are illustrated. Circles 51 represent the face of oscilloscope 42. In (a) signals 52–54 of different amplitude and phase are shown. Frequently, in flaw detectors such as shown in FIG. 1, a given flaw will produce an initial signal followed by a similar signal angularly displaced by 180°. Thus signals 52'–54' are also shown. The remaining figures show open sectors 55 or "windows" which display any flaw signals whose phases lie within the open sectors. The cross-hatched portions 56 represent areas where no signals will be displayed. The angular width and angular position of the windows is determined by the phase-angle control circuit 37 of FIG. 1, as will be described later.

In FIGS. 2(b) – 2(d), the windows have the same width but different angular positions. Thus in (b), signals 53, 53' will be displayed and the others eliminated. In (c), signals 52, 52' will be displayed and in (d) signals 54, 54' will be displayed, the other being eliminated. In (e) the windows 55' have been narrowed, and the angular position changed from (b). Signal 53 will still be displayed, but the range of phase-angles within which signals can be displayed is less. In (f) the window 55'' has been made quite wide so that only signals within the narrow range of hatched sectors 56'' will not be displayed.

Figure 3:
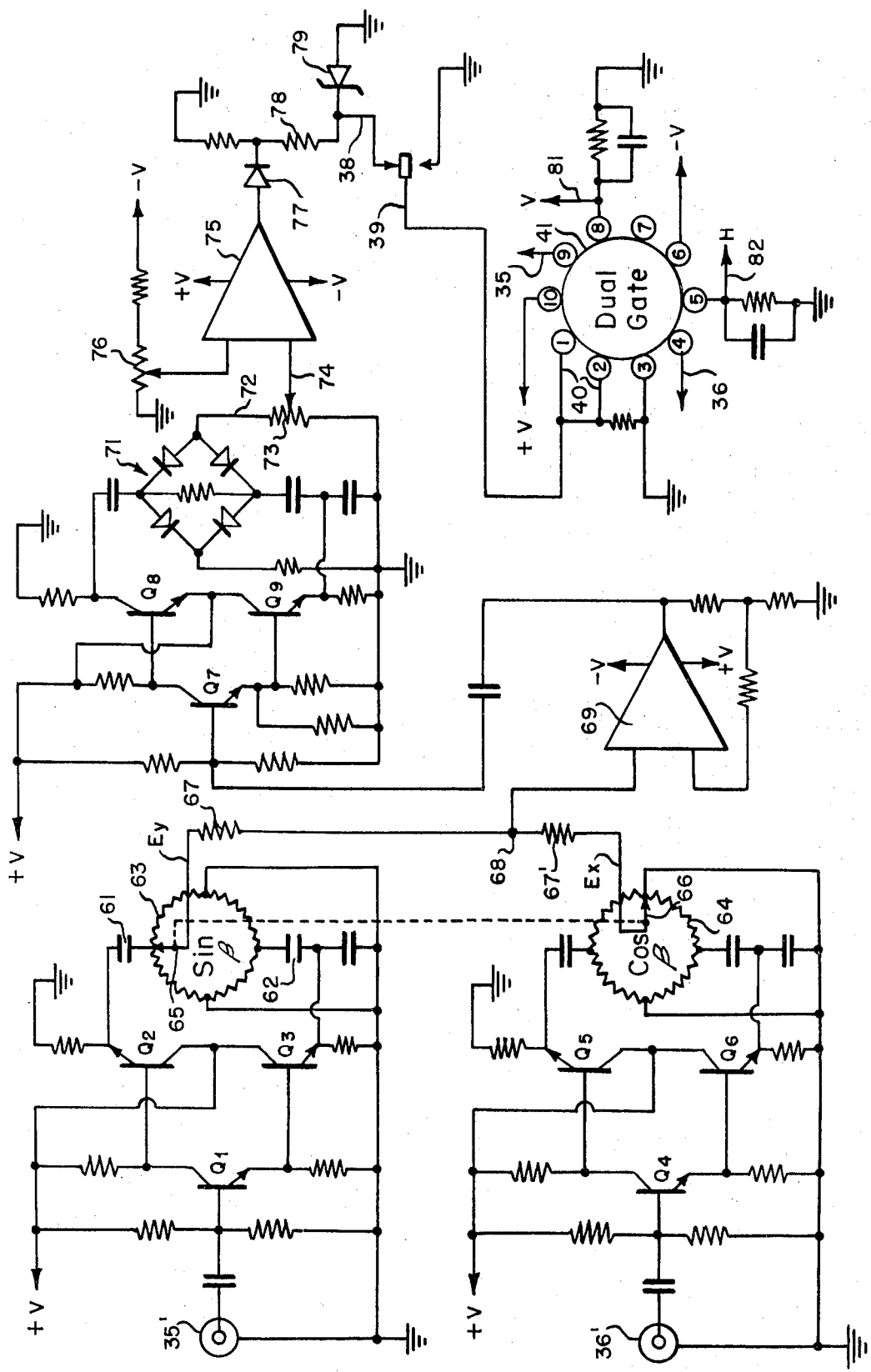
FIG. 3 is a circuit diagram of one embodiment of the invention.

Referring to FIG. 3, circuits are shown for the phase-angle control circuit 37 and dual gate 41 in the dotted box 40 of FIG. 1. The quadrature signal components from lines 35, 36 are supplied to respective input terminals 35', 36'. For convenience, the two inputs will be designated y and x. As seen in FIG. 4(a), for a vector of length R, $y = R \sin \alpha$ and $x = R \cos \alpha$. In the upper channel the signal y is applied to a 180° phase-splitter circuit including transistor Q1 and thence to a pair of emitter follower drivers Q2, Q3. The outputs of the latter will be 180° out of phase, and are supplied through capacitors 61, 62 to opposite terminals of a sine-cosine potentiometer 63. In the lower channel, the signal x is processed similarly by Q4, Q5, Q6 and applied across opposite terminals of sine-cosine potentiometer 64. The intermediate terminals of each potentiometer are grounded as shown.

The potentiometers are ganged together and only one slider of each is employed, slider 65 and slider 66 being at 90° from each other. Therefore, with the input connections as shown, as sliders 65, 66 are moved to different angular positions $\beta$, one input will be multiplied by $\sin \beta$ and the other by $\cos \beta$.

In general, it may be stated that for any values of the quadrature components there exists an angle $\beta$ with values of sine and cosine such that, when multiplied by the proper quadrature components and algebraically added, the resultant will be zero. The particular trigonometric equations and choice of sine and cosine will depend on the reference angles selected.

For purposes of explanation, it will here be assumed that x and y are as shown in FIG. 4(a), the polarities shown corresponding to the conventional quadrant representation. It will also be assumed that when vector R is at 90° and $\sin \alpha$ for the y component equals +1, the polarities of the y phase splitter Q1 and drivers Q2, Q3 cause the upper connection to potentiometer 63 to be positive and the lower connection negative. Similarly, when R is at 0° and $\cos \alpha$ for the x component equals +1, it will be assumed that the x phase splitter Q4 and drivers Q5, Q6 cause the upper connection to potentiometer 64 to be positive and the lower connection negative.

With the angle β measured from the position shown in FIGS. 4(b) and 4(c), and with slider 66 at a 90° angle ahead of slider 65, slider 65 will multiply the y input by sin β and slider 66 will multiply the x input by cos β, yielding respective outputs:

$$E_y = R \sin \alpha \sin \beta$$

$$E_x = R \cos \alpha \cos \beta$$

If $\beta = \alpha + 90°$, then $E_y + E_x$ is zero. Several examples will be given for illustration.

If α is zero and β is 90°, the sliders will be as shown in FIG. 3. Both $E_y$ and $E_x$ will be zero since sin α and cos β are zero. The same applies when α is 180° and β is 270°. If α is 90° and β is 180°, zero outputs will also be obtained since sin β and cos α are zero. The same is true when α is 270° and β is 360° (0°).

Considering intermediate points in the first and second quadrants, assume α is 45° and β is 135°, corresponding to the slider positions in FIGS. 4(b) and 4(c). $E_y$ will be R(0.707)(0.707) and $E_x$ will be R(0.707)(−0.707), thus being equal in amplitude but opposite in polarity. If α is 60° and β is 150°, then $E_y = R(0.866)(0.500)$ and $E_x = R(0.500)(−0.866)$. If α is 150° and β is 240°, then $E_y = R(0.500)(−0.866)$ and $E_x = R(−0.866)(−0.500)$. In both cases the quantities are equal in magnitude but opposite in sign.

Considering the third and fourth quadrants, if α = 240° and β = 330°, then $E_y = R(−0.866)(−0.500)$ and $E_x = R(−0.500;)(0.866)$. With α= 330° and β = 60°, $E_y = R(−0.500)(0.866)$ and $E_x = R(0.866)(0.500)$. In both cases the values are equal in magnitude and opposite in sign.

As illustrated in FIG. 2, a given setting of the sine-cosine potentiometers will produce a pair of windows which are 180° displaced. One example should suffice. Assume α= 240°, which is 180° displaced from the 60° example given above, and that β is 150° as in that example. The $E_y = (−0.866)(0.500)$ and $E_x = (−0.500)(−0.866)$, of equal magnitude but opposite polarity.

Figure 4:
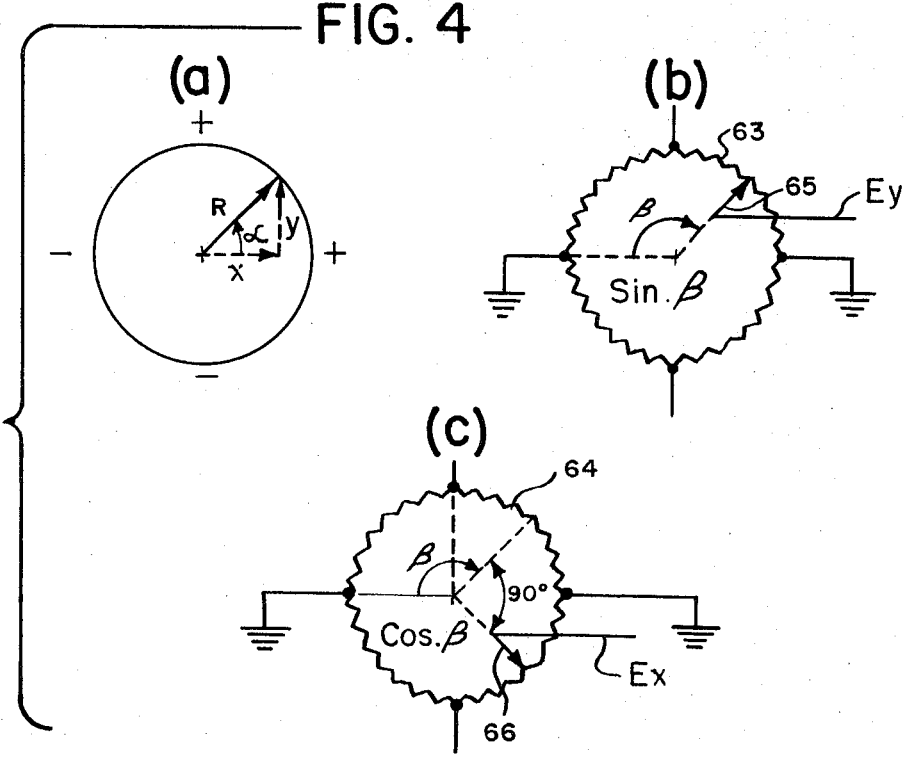
FIG. 4 illustrates angular relationships applicable to the circuit of FIG. 3.

It should be clearly understood that the equations and numeral values given above are based on the reference angles and angle directions shown in FIG. 4, and may be different if different assumptions are made. Broadly, as one quadrature signal component decreases and the other increases as α changes, the multiplying factors increase and decrease, respectively, to yield resultant signals which are equal in magnitude at the desired vector angle.

Instead of the sine-cosine potentiometers shown in FIG. 3, other arrangements for performing the desired multiplication may be employed if desired.

In FIG. 3 the resultant signals $E_y$ and $E_x$ are supplied to an algebraic adding circuit including equal resistors 67, 67'. The output at the junction point 68 will be zero when α and β bear the relationships described above. With a given potentiometer angle β, as the vector angle α changes the voltage at point 68 will change by equal amounts but opposite sign for equal vector angles on either side of the angle yielding zero voltage. For example, with β = 150°, a vector angle α = 60° gives zero output, as described above. If α changes to 90°, applying the equations given above yields an output +0.5R at point 68. If α changes to 30°, the output will be −0.5R.

The output at point 68 is supplied to amplifier 69, shown as a conventional operational amplifier, and the amplified output supplied to a 180° phase splitter circuit including Q7. The phase split outputs of Q7 are supplied through respective emitter-follower drivers Q8 and Q9 to a full-wave rectifier circuit 71. For a zero voltage at point 68, equal signals are applied to Q8 and Q9 and the rectified output in line 72 will be zero. The diodes in circuit 71 are poled to yield a negative output in line 72 as the voltage at point 68 changes in either polarity direction from zero. The rectified signal is applied to an adjustable potentiometer 73 whose slider is connected by line 74 to a differential amplifier 75. An adjustable negative bias is applied to the other input of the amplifier from potentiometer 76. The output of the differential amplifier is supplied through diode 77 and resistor 78 to line 38 and a contact engageable by switch arm 39, shown also in FIG. 1.

The differential amplifier is connected so that when the negative input in line 74 is less than the negative bias from potentiometer 76, the amplifier output will be zero or negative and is blocked by diode 77. Thus line 38 is at ground potential. When line 74 becomes more negative than the bias, the output goes positive and is passed by diode 77 to make line 38 positive. Zener diode 79 limits the positive excursion for protective purposes.

Switch arm 39 is connected to the control inputs 40 of a dual gate 41 which, as shown, is a commercially available type designed so that when the control inputs are grounded the gates are open and pass signals. The dual gate is supplied with V and H signals from lines 35, 36 as described in connection with FIG. 1, and passes then through lines 81, 82 to oscilloscope 42. When line 38 goes positive, the gates are closed and the corresponding signals are eliminated as illustrated in FIG. 2.

Conveniently, bias potentiometer 76 is an internal adjustment and the rectified signal potentiometer 73 is an external adjustment, thereby allowing any desired width of the acceptance angle sector or "window" to be selected. As previously described, the adjustment of the sine-cosine potentiometers 63, 64 permits locating the window at any desired angular orientation with respect to the phase of the input vector components. Thus both the angular position and width of the window are conveniently adjustable.

As described in connection with FIG. 1, the gate signal in line 39 may be supplied to another gate 45 which supplies either the V or H component, or preferably a vector amplitude signal derived from the V and H components, to subsequent circuits.

As shown in FIG. 3, switch arm 39 in its lower position grounds the control inputs of dual gate 41, so that all the signals picked up are displayed. This facilitates adjusting the window angle and width to the desired angle range. A push button switch may be employed for the purpose. If desired, a separate oscilloscope could be supplied from lines 35, 36 to continuously display all signals.

Instead of using the signal in line 38 to open the gates during the desired display angle sector, the signal could be used to close the gates during the undesired angle sector, as by inverting the gate signal or selecting an appropriate gate circuit.

Two or more phase-angle control circuits and gates may be employed to select corresponding angle sectors for display, if desired. This may be especially useful in separating O.D. and I.D. flaws, for example.

In the specific embodiment of FIG. 3, a simple resistance adding circuit is employed for algebraically adding the resultant quadrature components after multiplication by respective factors. Other adding or subtracting circuits may be employed if desired, and the sine-cosine potentiometers arranged to give outputs of appropriate polarity. For example, a differential amplifier provided with respective signals of the same polarity at the desired vector angle may be used. Also, biases may be introduced in the processing circuits so that a minimum rather than a zero value is produced when the multiplied signals are of substantially equal amplitude.

With the full-wave rectification shown, the window broadens symmetrically with respect to the mid angle thereof. This is preferred. However, if desired, only one polarity of deviation from the equal amplitude condition might be employed, so that the window opens in only one direction from the equal amplitude condition. This may be effected by designing the circuits to amplify only one polarity of deviation, or by half-wave rectification, etc.

These and other modifications may be made by those skilled in the art within the spirit and scope of the invention.

The specific embodiment described is an eddy current flaw detector, but it will be understood that the invention may also be used with eddy current comparator type instruments wherein an object under test is compared with a reference object. Although the phase-range limiting apparatus described is especially designed for eddy current testing apparatus, it could also be used in other environments where quadrature components are available or can be produced, and it is desired to limit the phase-angle response range.

We claim:

1. In eddy current testing apparatus including test coil means energized to induce eddy currents in an object under test and producing an output signal whose amplitude and phase change with variations in the object, means for limiting the range of phase angles within which signals are supplied to an output circuit for indication or classifying which comprises
   a. means for producing quadrature signal components of said output signal,
   b. adjustable sine-cosine multiplying means for receiving said quadrature signal components and multiplying the components by respective sine and cosine functions to yield respective signals of substantially equal amplitude at a phase angle of the quadrature signal components depending on the setting of the multiplying means,
   c. combining means responsive to said respective signals for yielding an output of minimum value when the signals are of substantially equal amplitude and of progressively greater value as the signals become unequal,
   d. threshold means responsive to the output of said combining means for producing a gate signal when the output lies within a range corresponding to a limited phase angle range of said quadrature components,
   e. a gate circuit having an input supplied with a signal corresponding to at least one of said quadrature signal components and having an output,
   f. means for supply said gate signal to said gate circuit to limit the output thereof to signals lying within a restricted range of phase angles,
   g. and means for supplying the output of said gate circuit to indicating or classifying means.

2. Apparatus according to claim 1 in which said adjustable sine-cosine multiplying means includes a pair of ganged sine-cosine potentiometers supplied with said quadrature signal components respectively, said potentiometers having respective sliders relatively oreinted to multiply the inputs thereto by respective sine and cosine functions.

3. Apparatus according to claim 1 in which said combining means includes algebraic adding means for yielding outputs of opposite polarity with respect to said minimum value when the signals thereto become unequal in opposite directions, and rectifying means for producing an output of the same polarity for either polarity of said outputs of opposite polarity.

4. Apparatus according to claim 2 in which said combining means includes a resistive adder circuit to which the sliders of said potentiometers are connected, and means for amplifying and full-wave rectifying the output of the resistive adder circuit.

5. Apparatus according to claim 1 in which said gate circuit is a dual gate supplied with respective quadrature signal components, and including an oscilloscope supplied with the outputs of said dual gate to produce a polar display of signals lying within said restricted range of phase angles.

6. Apparatus according to claim 1 including means supplied with said quadrature signal components for producing an output approximately proportional to the amplitude of the vector represented by said quadrature components, the last-mentioned output being supplied to the input of said gate circuit, and a threshold control circuit supplied with the output of said gate circuit for supplying vector amplitudes above a predetermined amplitude to said indicating or recording means.

* * * * *